United States Patent [19]

Seki

[11] 4,371,059
[45] Feb. 1, 1983

[54] AUTOMATIC ADJUSTING DEVICE IN A DISC BRAKE

[75] Inventor: Masayuki Seki, Nagano, Japan

[73] Assignee: Nissin Kogyo Kabushiki Kaisha, Japan

[21] Appl. No.: 203,462

[22] Filed: Nov. 3, 1980

Related U.S. Application Data

[63] Continuation of Ser. No. 8,860, Feb. 2, 1979, abandoned.

[30] Foreign Application Priority Data

Feb. 6, 1978 [JP] Japan .............................. 53-13566[U]
Feb. 7, 1978 [JP] Japan .................................. 53-12612

[51] Int. Cl.³ ............................................. F16D 55/18
[52] U.S. Cl. ................................ 188/71.8; 188/196 P; 188/352
[58] Field of Search .......... 188/71.8, 79.5 GE, 196 P, 188/344, 352

[56] References Cited

U.S. PATENT DOCUMENTS

| | | | |
|---|---|---|---|
| 1,755,829 | 4/1930 | Loughead | 188/196 P X |
| 3,064,768 | 11/1962 | Dotto | 188/196 P X |
| 3,339,683 | 9/1967 | Burnett | 188/196 P |
| 3,952,841 | 4/1976 | Pringle | 188/71.8 |
| 4,163,483 | 8/1979 | Baba et al. | 188/71.8 |

FOREIGN PATENT DOCUMENTS 1227387 10/1961 France .............................. 188/196 P
Ad.76776
41-28580 4/1966 Japan .................................. 188/71.8

Primary Examiner—Duane A. Reger
Attorney, Agent, or Firm—Armstrong, Nikaido, Marmelstein & Kubovcik

[57] ABSTRACT

An automatic adjusting device in a disc brake for adjusting a clearance between a brake disc and a friction pad. A fixed pin is axially disposed within a hydraulic cylinder, and a regulating plate frictionally fitted over, the fixed pin is connected to the piston through a return spring having a given deformation allowance. The fixed pin, the regulating plate and the return spring cooperate to automatically move the piston backward at all times in a given amount and accurately. The amount of backward movement of the piston is sufficiently obtained by selection of a predetermined deformation allowance of the return spring, thus automatically and sufficiently obtaining a clearance between the brake disc and the friction pad.

1 Claim, 5 Drawing Figures

AUTOMATIC ADJUSTING DEVICE IN A DISC BRAKE

This is a continuation of application Ser. No. 8,860, filed Feb. 2, 1979, now abandoned.

BACKGROUND AND SUMMARY OF THE INVENTION

The present invention relates to an automatic adjusting device in a disc brake for adjusting a clearance between a brake disc and a friction pad so as to form a given clearance therebetween. The present invention has its primary object to automatically obtain a sufficient amount of backward movement of a piston for urging a friction pad, when the brake is released, so that a dragging phenomenon of the friction pad to the brake disc is eliminated even if the great lateral oscillation of the rotating brake disc is encountered thereby preventing the wear of the friction pad resulting from said phenomenon. The invention has another object to make use of constituent members of the aforementioned device so that air within the hydraulic cylinder may be removed to simplify the construction.

DESCRIPTION OF THE PREFERRED EMBODIMENTS

In the following, embodiments of the present invention will be described with reference to the drawings.

Figure 1:
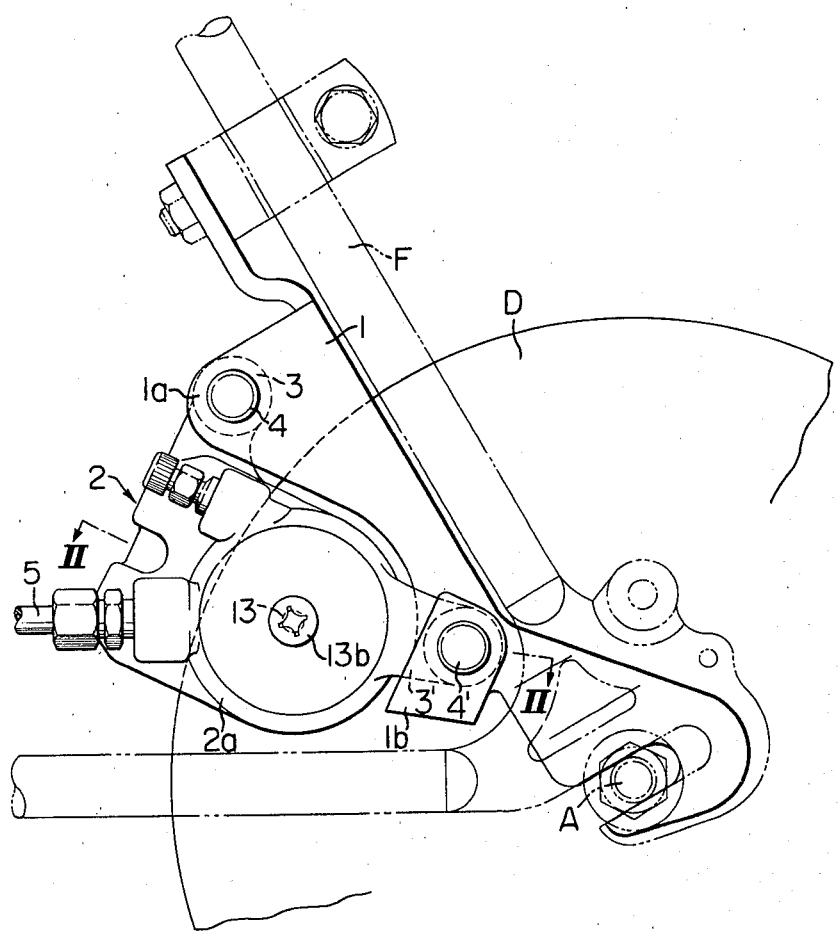
FIG. 1 is a side view of a first embodiment of the device in accordance with the present invention.
Figure 2:
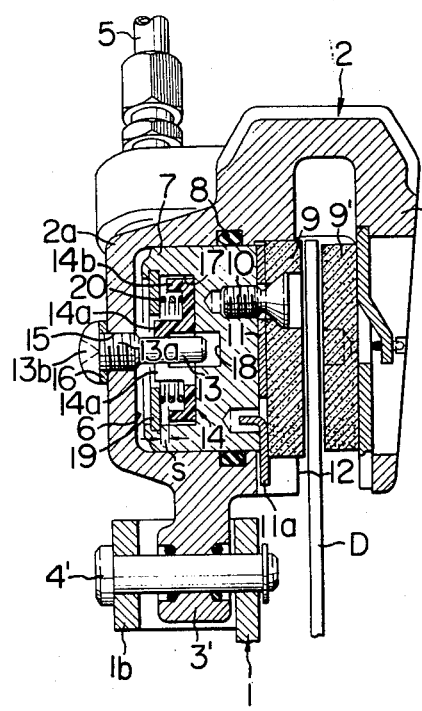
FIG. 2 is a sectional view taken along the line II—II in FIG. 1.
Figure 3:
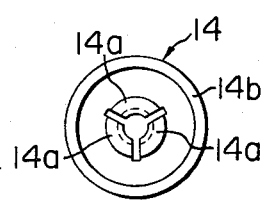
FIG. 3 is a plan view of a regulating plate.
Figure 5:
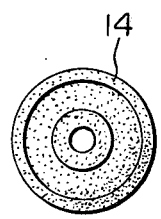
FIG. 5 is a plan view of a regulating plate therefor.

First, in a first embodiment shown in FIGS. 1 to 3, in which a disc brake unit for a bicycle is illustrated, where reference character F indicates a vehicle body of the bicycle for supporting a rear axle A, and D indicates a brake disc which rotates around the rear axle A integral with a rear wheel (not shown). Reference numeral 1 indicates a bracket adjacent one side of the brake disc D and fixedly mounted on the body F.

The bracket 1 is provided with a pair of upper and lower channel-like supports 1a and 1b, a pair of upper and lower lugs 3, 3' of a brake caliper 2 are inserted with a play internally of the supports. Two support shafts 4, 4' mounted on the supports 1a, 1b slidably extend through the lugs 3, 3' to support the brake caliper 2. Both the support shafts 4, 4' are arranged in parallel with a rotating axis of the brake disc D so that the brake caliper 2 is guided to be movable in the direction of the rotating axis of the brake disc D.

The brake caliper 2 has a pair of arms 2a and 2b laterally sitting astride of a part of the brake disk D, the left arm 2a being formed with a hydraulic cylinder 6, which is in communication with a known brake master cylinder not shown through a hydraulic conduit 5, and in which a piston 7 is slidably received through an annular seal ring 8.

A movable friction pad 9 opposing the left side of the brake disc D is detachably connected to the outer end of the piston 7 by means of a screw 10, and an anti-rotative plate 11 is held between the piston 7 and the friction pad 9. A fixed friction pad 9' opposing the right side of the brake disk D is detachably fastened by a suitable fastening means to the left arm 2b of the brake caliper 2.

The anti-rotative plate 11 causes a stop pawl 11a protruded from an outer peripheral edge thereof to engage an axial stop groove 12 formed in the arm 2a to thereby impede the rotation of the movable friction pad 9 and piston 7.

The piston 7 has a large diameter recess 17 disposed in a central portion of an inner end surface thereof, the recess 17 having a small diameter recess 18 in a central portion of the bottom thereof, the large diameter recess 17 receiving therein a regulating plate 14.

The regulating plate 14, which is formed of synthetic resin into an annular shape as a whole, is provided integrally with a plurality of resilient chuck pawls 14a at the inner peripheral end which cooperate with each other for holding operation and a cylindrical reinforcing flange 14b at the outer peripheral end, said resilient chuck pawls 14a holding a fixed pin 13 arranged in an axial direction within the hydraulic cylinder 6. Thus, the regulating plate 14 is frictionally connected to the fixed pin 13 through the resilient chuck pawls 14a. The fixed pin 13 has a base end formed with a screw-like mounting screw portions 13a, and the screw portion 13a is fixedly screwed into an air vent 15 which extends through the end wall of the hydraulic cylinder 6 so that the fixed screw 13 is fixedly mounted on the brake caliper 2. A packing 16 is interposed between a head 13b of the mounting screw portion 13a and the outer surface of the brake caliper 2 to prevent oil leakage from the air vent 15. Thus, when the mounting screw portion 13a is loosened, bubbles in oil within the hydraulic cylinder 6 may be discharged through the air vent 15. the tip of the fixed pin 13 is received within the above-mentioned small diameter recess 18 so as not to impair the operation of the piston 7.

An abutting plate 19 is fixedly mounted on the piston 7 to restrict the axial displacement of the regulating plate 14 to a given amount s within the recess 17, and a coiled return spring 20 is retained between the regulating plate 14 and the abutting plate 19. The aforesaid amount of displacement s of the regulating plate 14 serves as the predetermined deformation allowance of the return spring 20.

In view of the above, let $F_1$ represent the frictional resistance between the chuck pawl 14a of the regulating plate 14 and the fixed pin 13, $F_2$ represent the force of the return spring 20, and $F_3$ represent the frictional resistance between the piston 7 and the hydraulic cylinder 6, then the relationship as in the following formula will be established.

$$F_1 > F_2 > F_3$$

Next, the operation of the above-mentioned embodiment will be described. When the brake master cylinder not shown is operated to feed pressure oil to the hydraulic cylinder 6, the resultant oil pressure causes the piston 7 to move rightward as viewed in FIG. 2 so that the movable friction pad 9 is brought into pressure contact with the left side surface of the brake disc D. With this, the brake caliper 2 is slidably moved leftward by reaction along the support shafts 4, 4' so that the fixed friction pad 9' is brought into pressure contact with the right side surface of the brake disk D. In this way, the brake disc D is braked by equally receiving the frictional braking force from both the friction pads 9 and 9'.

In this case, the axial relative displacement between the piston 7 and the hydraulic cylinder 6 brings forth the relative displacement between the abutting plate 19 and the fixed pin 13 with the result that at first the return spring 20 is compressed and deformed in terms of the aforementioned formula $F_1 > F_2$. After said deformation has reached the predetermined amount s, that is, after the regulating plate 14 is placed in contact with the abutting plate 19, an axial skid occurs between the chuck pawl 14a of the regulating plate 14 and the fixed pin 13 as the relative displacement between the piston 7 and the hydraulic cylinder 6 advances.

Then, when the master cylinder is made inoperative to release oil pressure within the hydraulic cylinder 6 in order to release the braking of the brake disc D, a skid will not occur between the regulating plate 14 and the fixed plate 13 in terms of the relationship of the above-mentioned formula $F_1 > F_2 > F_3$, and the piston 7 is moved backward through the abutting plate 19 by the force of the return spring 20. In this case, the amount of backward movement of the piston will not exceed the controlling amount of the return spring 20, namely the predetermined amount of deformation. As a result, there is obtained a clearance corresponding to the predetermined amount of deformation s of the return spring 20 between the brake disc D and the friction pads 9 and 9'.

Figure 4:
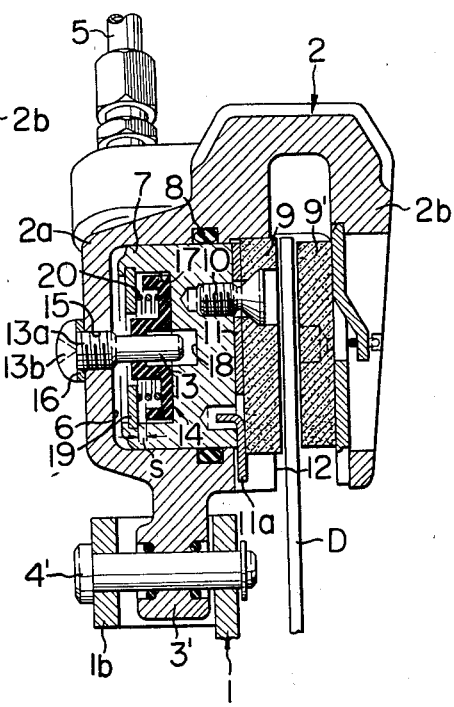
FIG. 4 is a sectional view of second embodiment corresponding to that of FIG. 2.

FIGS. 3 and 4 illustrate a second embodiment of the present invention, which has the structure similar to that of the preceding embodiment with the exception that a regulating plate 14 is formed of a resilient material such as rubber into an annular shape and is frictionally connected to a fixed pin 13 by the resilient and contracting force of the regulating plate itself. In the second embodiment, those corresponding to parts in the preceding embodiment are indicated by like reference numerals.

As described above, in accordance with the present invention, the fixed pin, the regulating plate and the return spring cooperate with one another so that when the brake is released, it is possible to always and automatically move the piston backward in a given amount and in an accurate manner. Further, the amount of backward movement of the piston may be sufficiently obtained by selection of the predetermined deformation allowance of the return spring. Accordingly, it is possible to automatically obtain a sufficiently large clearance between the brake disc and the friction pad, and even if a great lateral oscillation of the rotating brake disc is encountered, it is possible to eliminate the dragging phenomenon of the friction pads thus preventing occurrence of the dragging wear thereof. In addition, since the amount of backward movement of the piston is always constant as previously described, it is possible to operate the piston with a given operating stroke of the brake operating member in spite of wear of the friction pads, thus providing the positive operation at all times.

In addition, particularly, the aforesaid regulating plate is substantially formed into an annular shape and has a plurality of resilient chuck pawls protruded from the inner peripheral end thereof, said chuck pawls being placed in engagement with the fixed pin. With this, a stabilized frictional connection between the regulating plate and the fixed pin maybe obtained by a simple construction; the operation is positive; and parts are small in number thus simplifying the construction.

Moreover, since the fixed pin is fixedly mounted on the brake caliper by screwing the mounting screw portion of the base end thereof into the air vent formed in the end wall of the hydraulic cylinder, the mounting screw portion of the fixed pin may be used also as a plug for the air vent, thus resulting in a decrease in number of parts and the construction is further simplified.

Through a few presently preferred embodiments of the invention which have been shown and described, it will be apparent to those skilled in the art that many changes and modifications may be made therein without departing from the spirit or scope of the invention as defined in the appended claims.

What is claimed is:

1. An improved automatic adjusting device in a disc brake of the type having a pair of friction pads, a brake caliper with a hydraulic cylinder, and a piston slidably mounted in said cylinder for urging said friction pads on the opposite sides of said brake disc for adjusting clearances between said brake pads and the brake disc at a constant level, wherein the improvement comprises:

adjusting means comprising a screw plug with a head portion detachably threaded in an air vent opening in an end wall of said cylinder, a fixed pin formed integrally with an inner end of said screw plug extending into hollow interior of said cylinder, a regulating plate disposed in a recess formed in said piston and having at its inner periphery a plurality of resilient chuck pawls mounted on said fixed pin for sliding frictional engagement and at its outer periphery a flange portion, an abutment plate fixedly secured to said piston and arranged in opposing relation with said flange portion of said regulating plate for limiting the axial displacement between said piston and said regulating plate to a given amount, and a return spring disposed between said abutment plate and said regulating plate for urging these plates in a direction apart from each other, the spring force of said return spring being larger than the force of friction engagement between said hydraulic cylinder and said piston but smaller than the force of frictional engagement between said fixed pin and said regulating plate whereby upon loosening of said screw plug, air in said cylinder can be vented through said vent opening and then said screw plug can be tightened to seal said cylinder.

* * * * *